Jan. 2, 1934.  P. M. FONTAINE  1,941,981
SCALE
Filed June 28, 1932
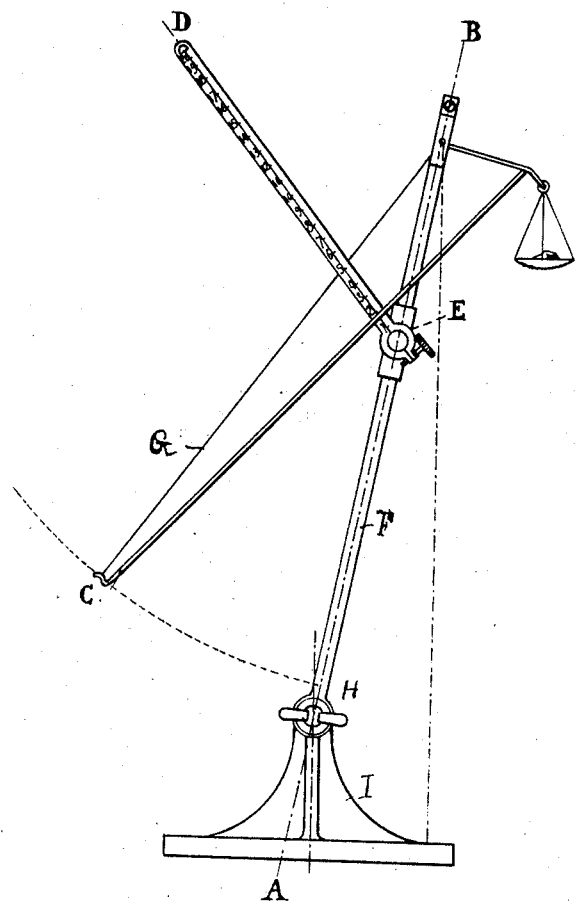
Inventor,
Pierre Marie Fontaine,
By Alpu Sll...
att.

Patented Jan. 2, 1934

1,941,981

UNITED STATES PATENT OFFICE 1,941,981

SCALE

Pierre Marie Fontaine, St.-Andre-lez-Lille, France

Application June 28, 1932, Serial No. 619,706, and in France July 2, 1931

4 Claims. (Cl. 265—29)

My invention relates to scales and more particularly scales known as sensitive scales, and the object of the present invention is to produce a scale of that kind, at the same time of simple construction and yet extremely accurate in operation.

According to the single figure shown on the accompanying drawing, the scale embodying my invention comprises a graduated indicator, D, an oscillating weighing beam, C, and a supporting column, F, carrying said indicator and weighing beam, and itself pivotally mounted at H to a base I. The indicator D is graduated regularly at equal intervals and is adapted to be moved on the column F along the line A—B and angularly adjusted so as to permit the indicator to be set for different values which can be read off on the indicator in the exact proportions, according to the different positions of the weighing beam C, said proportions being based on a definite weight unit.

As shown on the annexed drawing, the indicator D is pivoted to a slide E, by means of which the indicator can be moved along the column F. The beam C has the shape of a bow, and the divisions on indicator D are read off with the aid of two parallel threads stretched on the beam C in the same plane, one behind the other.

The scale, according to this invention, offers the advantage of permitting very precise and accurate weighing down to one-tenth of a milligram, and by reason of indicator D being capable of being moved along the column F by means of the slide E and angularly adjusted, the scale can be readily adjusted to greatly different weight standards.

The weighing beam C being preferably provided with two parallel threads G, the additional advantage of an exact reading of the indicator is afforded, for when using the scale, the observer directs his eye so that the two threads appear exactly in line with each other and with the division marks on the indicator.

I claim:

1. In a scale, in combination a supporting column, a graduated indicator adapted to be moved along said column and to be angularly adjusted relative thereto, a weighing beam oscillatingly mounted on said column so as to be displaced relative to the graduations on said indicator, and means on said beam permitting the reading of said indicator.

2. In a scale, in combination a supporting column, a slide adapted to be moved along said column, a graduated indicator pivoted to said slide, a weighing beam oscillatingly mounted on said column so as to be displaced relative to the graduations of said indicator, and means on said beam permitting the reading of said indicator.

3. In a scale, in combination, a supporting column, a graduated indicator adapted to be moved along said column, a weighing beam oscillatingly mounted on said column so as to be displaced relative to the graduations on said indicator, and at least one thread stretched on said beam permitting the reading of the graduations on said indicator.

4. In a scale, in combination, a base, a supporting column pivoted to said base, a graduated indicator adapted to be moved along said column and to be angularly adjusted relative thereto, a weighing beam ocsillatingly mounted on said column to be displaced relative to the graduations on said indicator, and two parallel threads stretched on said weighing beam one behind the other permitting the reading of said indicator.

PIERRE MARIE FONTAINE.